United States Patent
Nygren, Jr.

[11] Patent Number: 5,079,471
[45] Date of Patent: Jan. 7, 1992

[54] HIGH TORQUE HARMONIC TRACTION MOTOR

[75] Inventor: William D. Nygren, Jr., Denver, Colo.

[73] Assignee: Martin Marietta Corporation, Bethesda, Md.

[21] Appl. No.: 533,072

[22] Filed: Jun. 4, 1990

[51] Int. Cl.[5] .................... H01L 41/12; H02N 2/00
[52] U.S. Cl. .................................. 310/328; 318/118
[58] Field of Search .................. 310/323, 328, 26; 318/118

[56] References Cited

U.S. PATENT DOCUMENTS

| | | |
|---|---|---|
| 1,804,838 | 5/1931 | Meissner . |
| 3,315,103 | 4/1967 | Duff et al. . |
| 4,019,073 | 4/1977 | Vishnevsky et al. . |
| 4,339,682 | 7/1982 | Toda et al. . |
| 4,399,386 | 8/1983 | Osaka et al. . |
| 4,455,501 | 6/1984 | Tojo et al. . |
| 4,468,583 | 8/1984 | Mori . |
| 4,471,256 | 9/1984 | Igashira et al. . |
| 4,562,374 | 12/1985 | Sashida .................... 310/328 |
| 4,636,679 | 1/1987 | Glett et al. . |
| 4,639,630 | 1/1987 | Rodloff et al. . |
| 4,743,792 | 5/1988 | Ueyama ..................... 310/328 |
| 4,782,262 | 11/1988 | Kiyo-Oka .................. 310/323 |

FOREIGN PATENT DOCUMENTS 160384  8/1985  Japan ........................ 310/328

Primary Examiner—Steven L. Stephan
Assistant Examiner—D. L. Rebsch
Attorney, Agent, or Firm—Fields, Lewis, Pittenger & Rost

[57] ABSTRACT

A harmonic traction motor for converting linear motion to rotational motion. A driven shaft is surrounded by the annulus of a shaft driving member having a circumference slightly larger than the circumference of the shaft. At least two actuating devices are connected between the support and the driving member at 90° with respect to each other and sequentially energized to cause the annulus to exert a force around the shaft in a hypocycloidic motion. This motor has high torque, high stiffness, zero backlash and small volume and can be operated in a stepping mode and can be used as a brake or clutch, if desired.

6 Claims, 6 Drawing Sheets

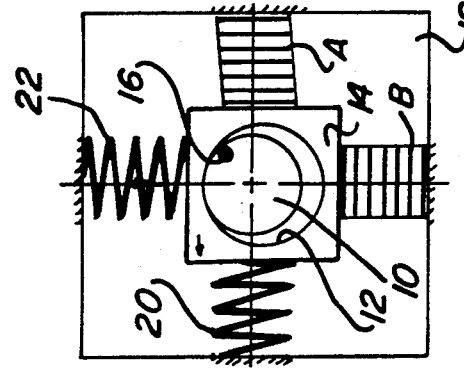
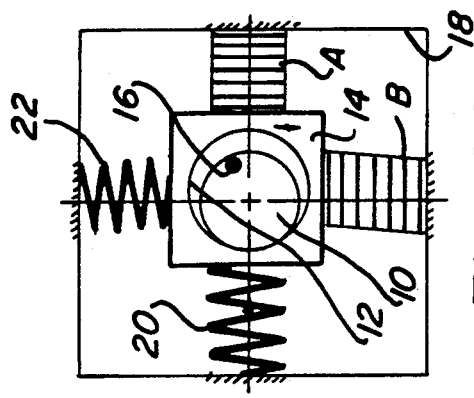
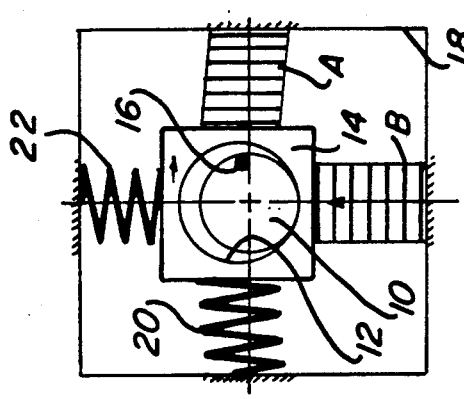
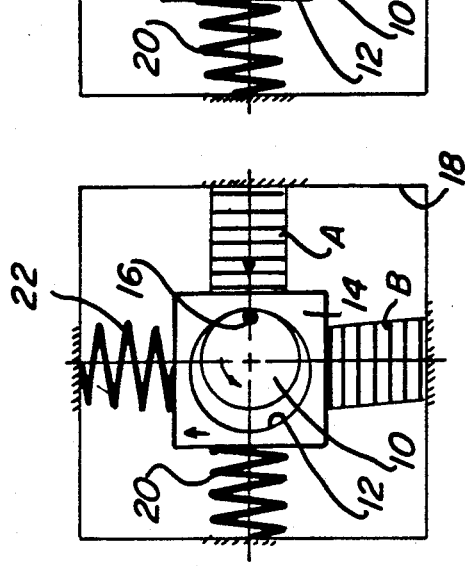
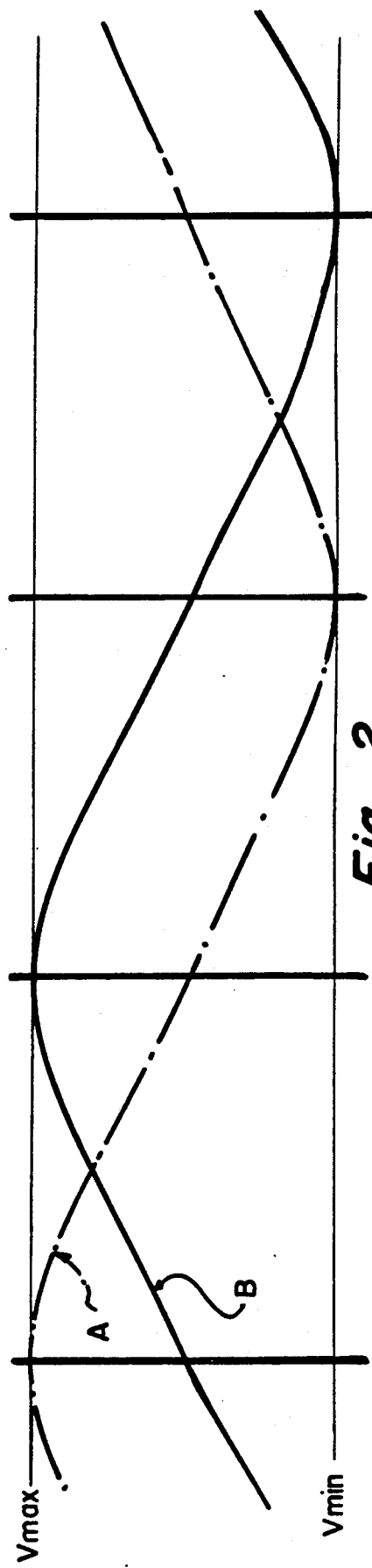

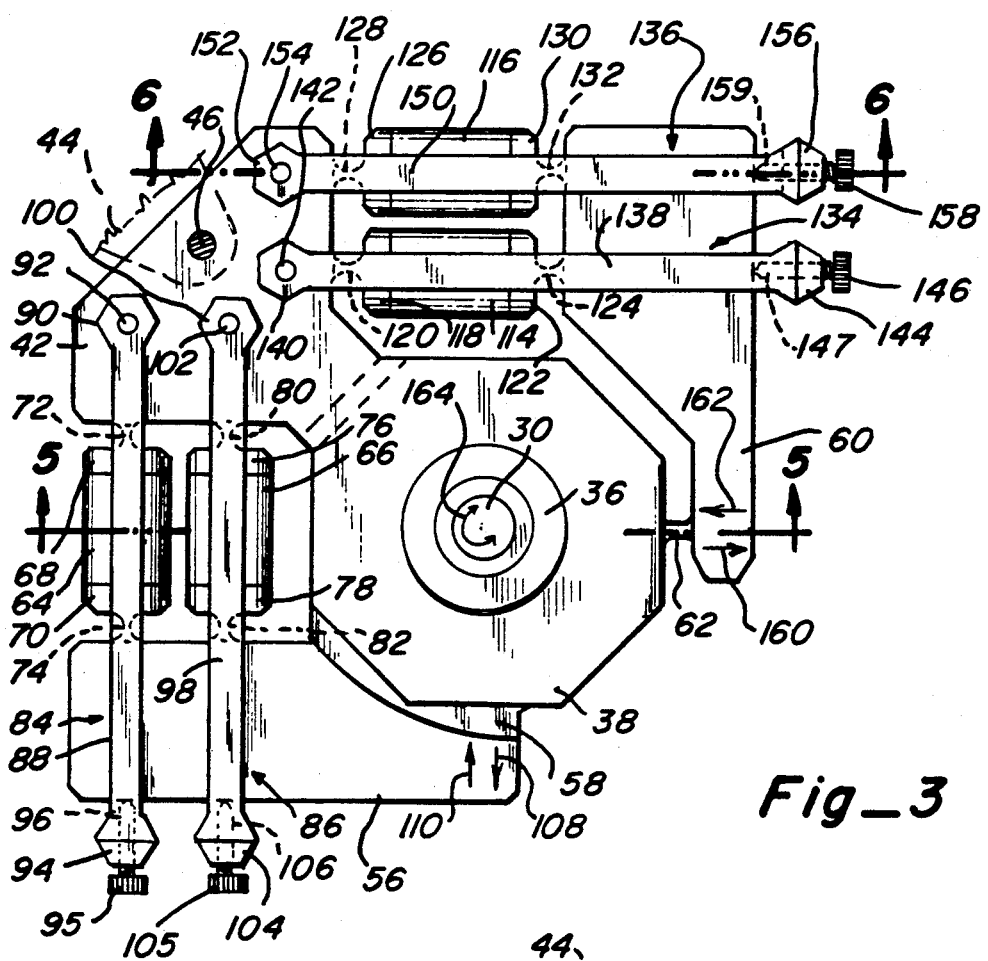
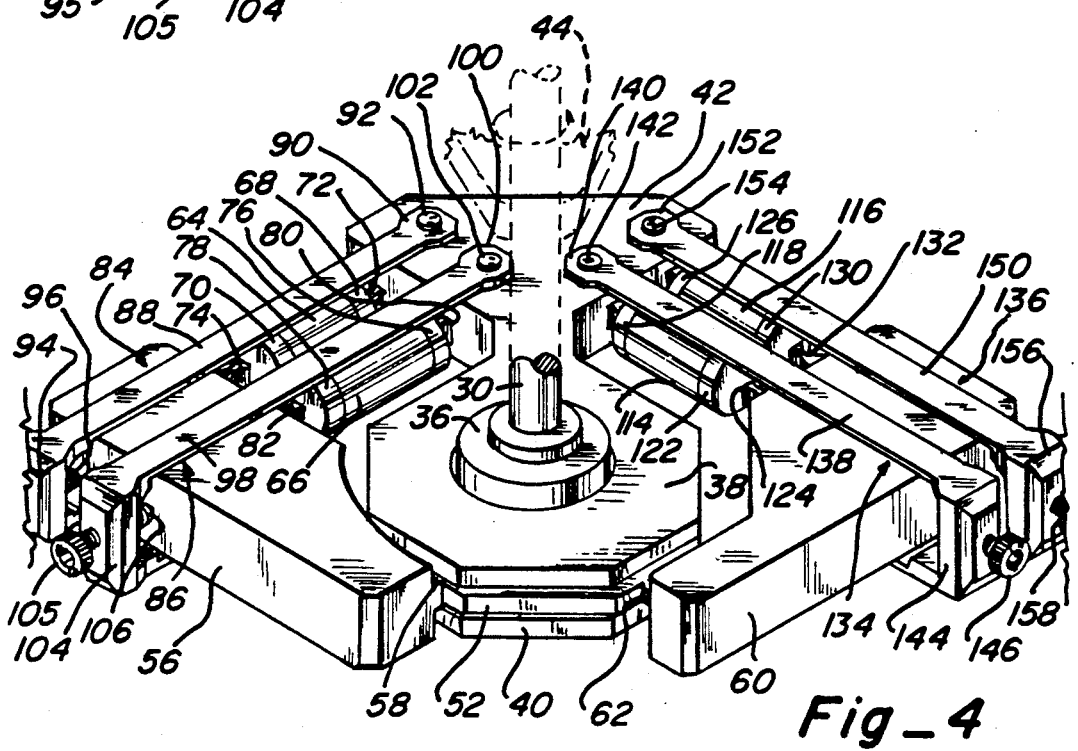

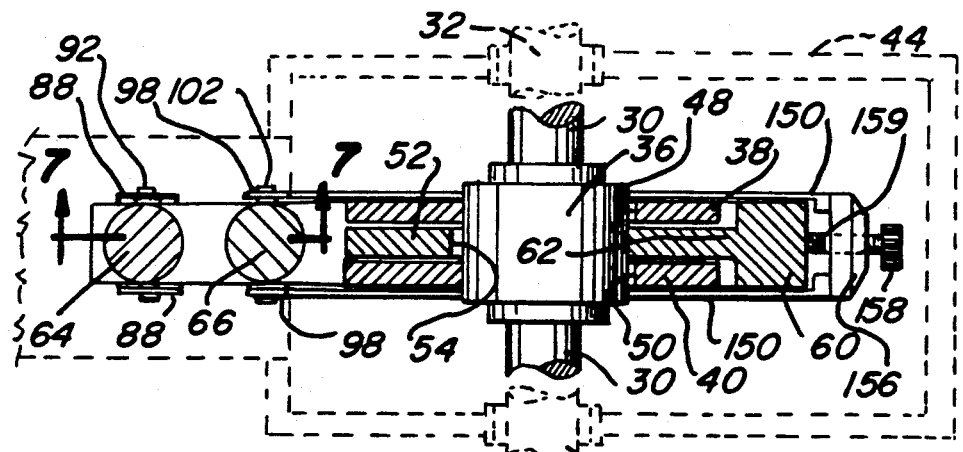
Fig_5
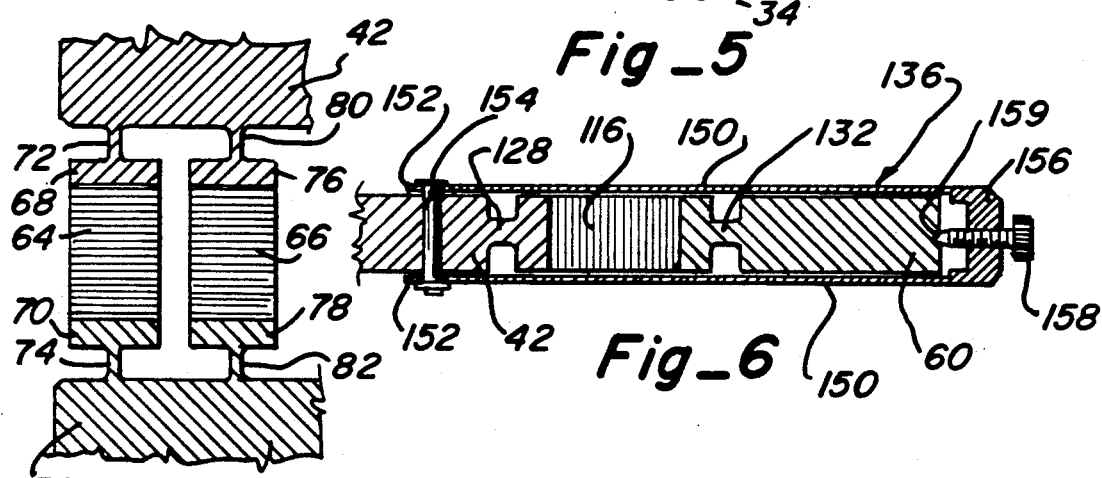
Fig_6
Fig_7
Fig_8
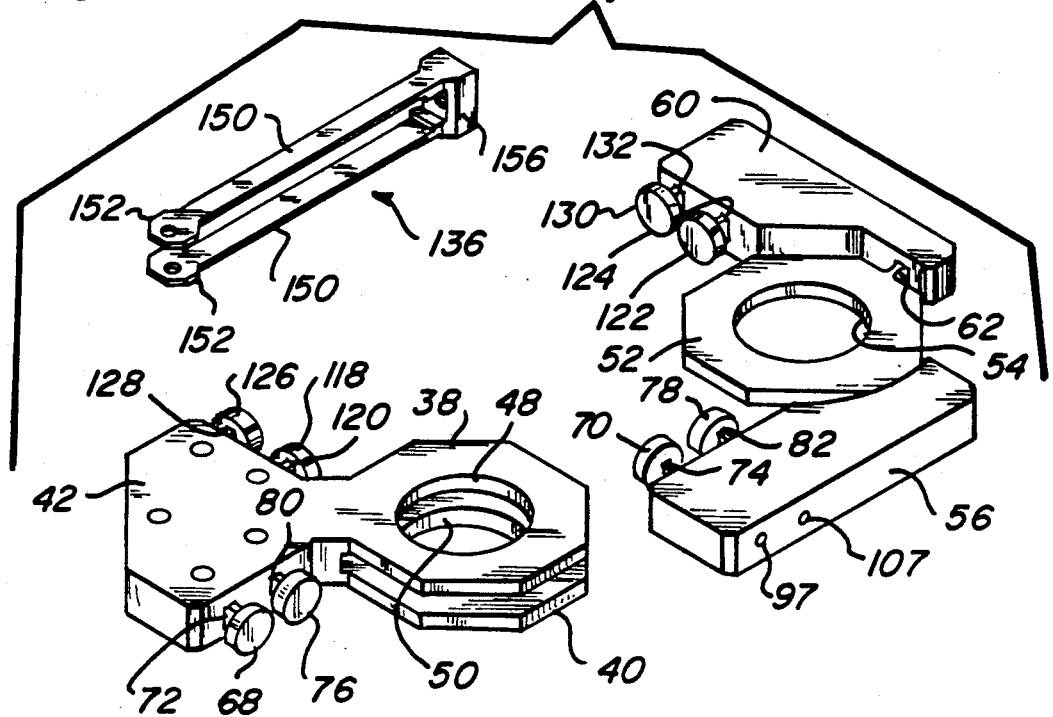

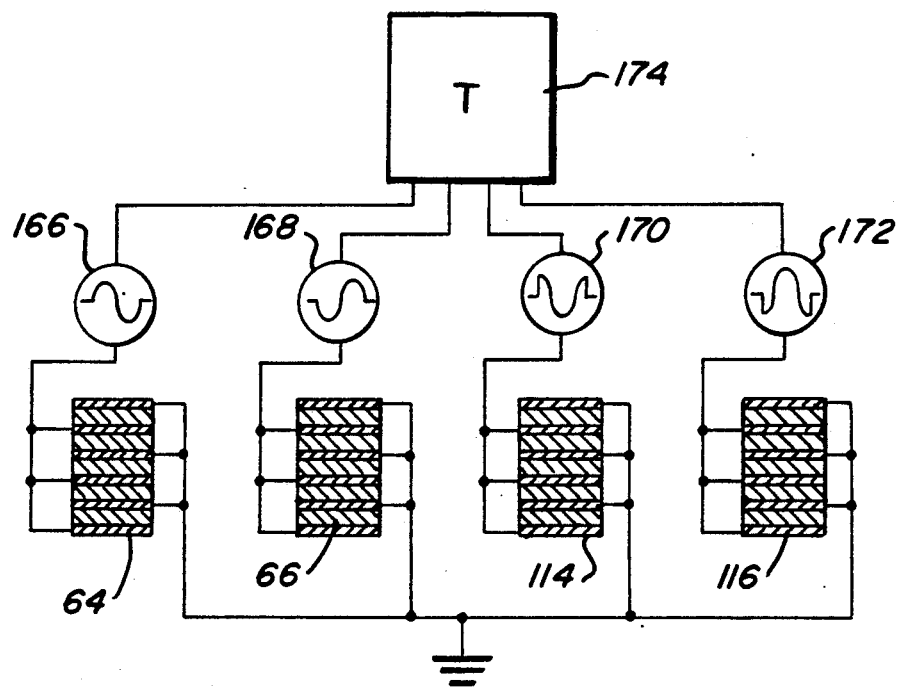
Fig_9
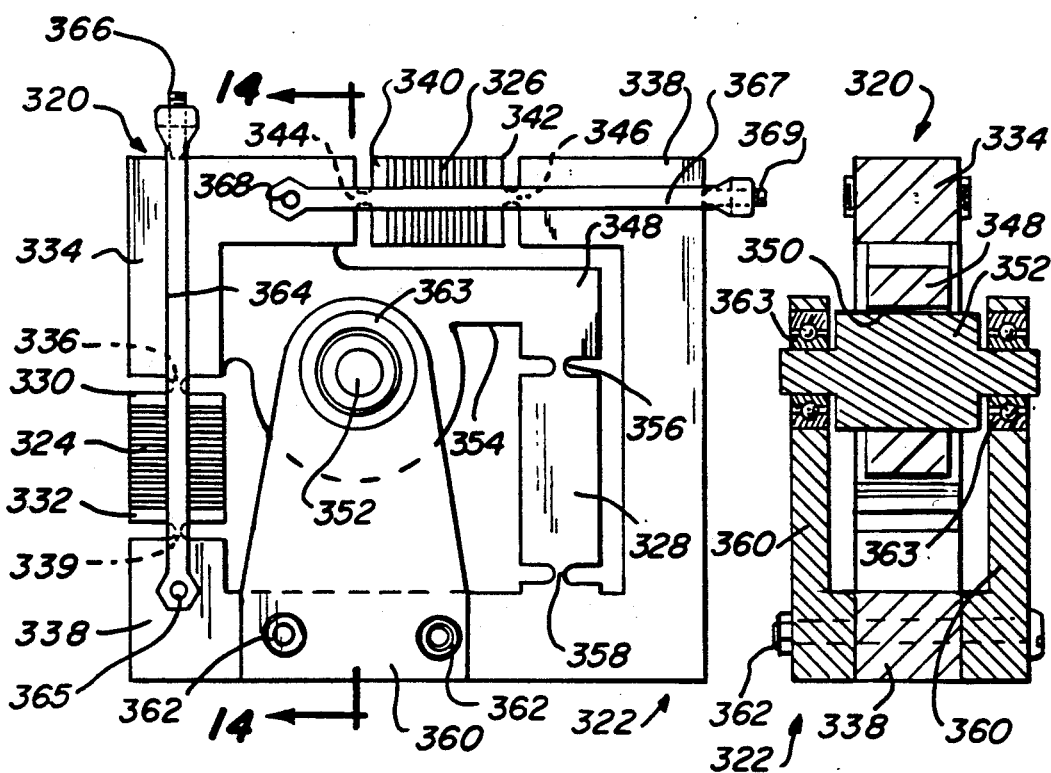
Fig_13  Fig_14

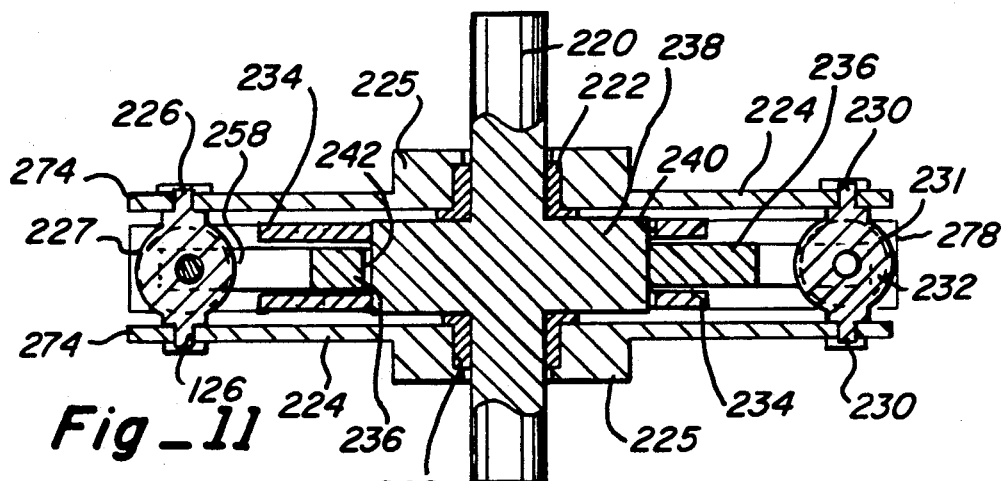
Fig_11
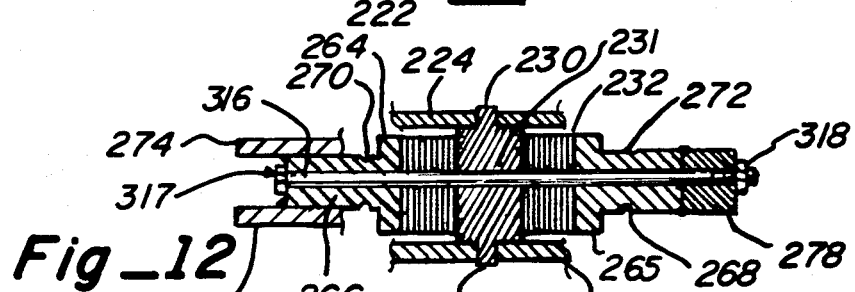
Fig_12
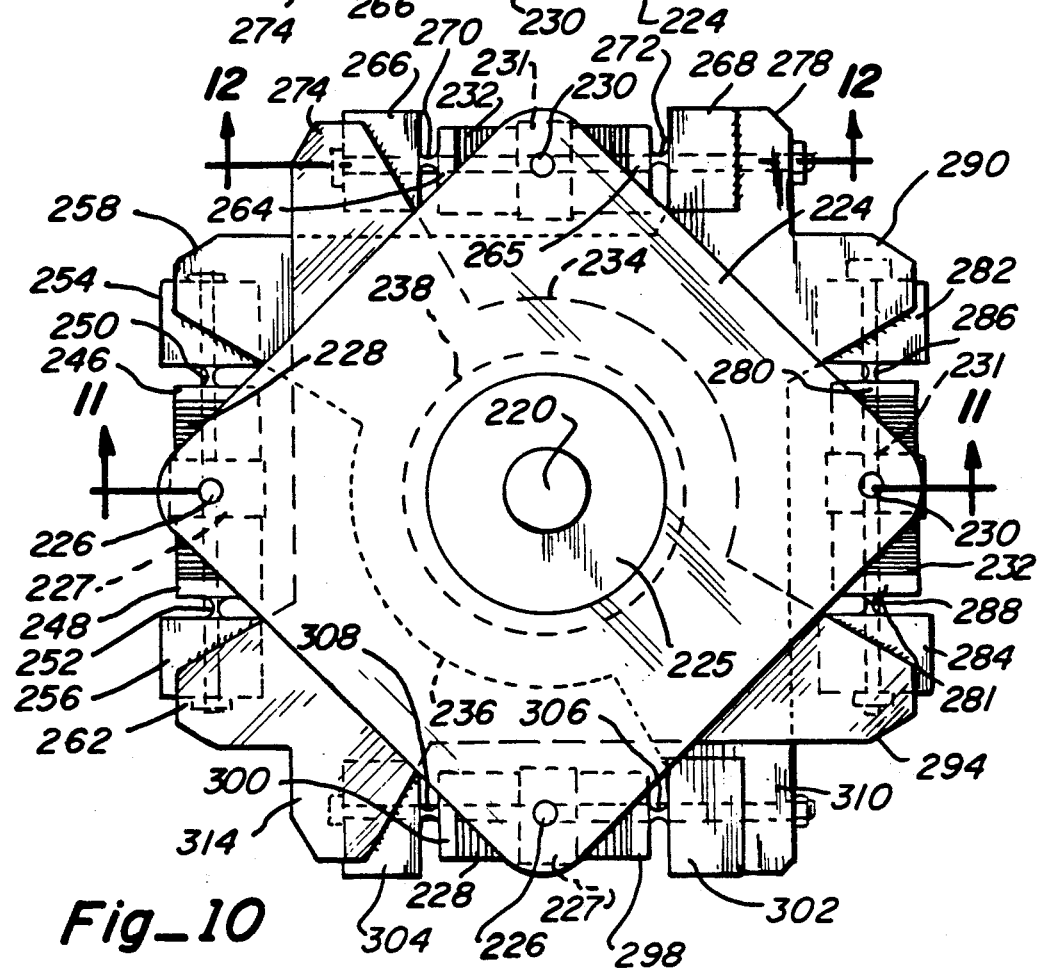
Fig_10

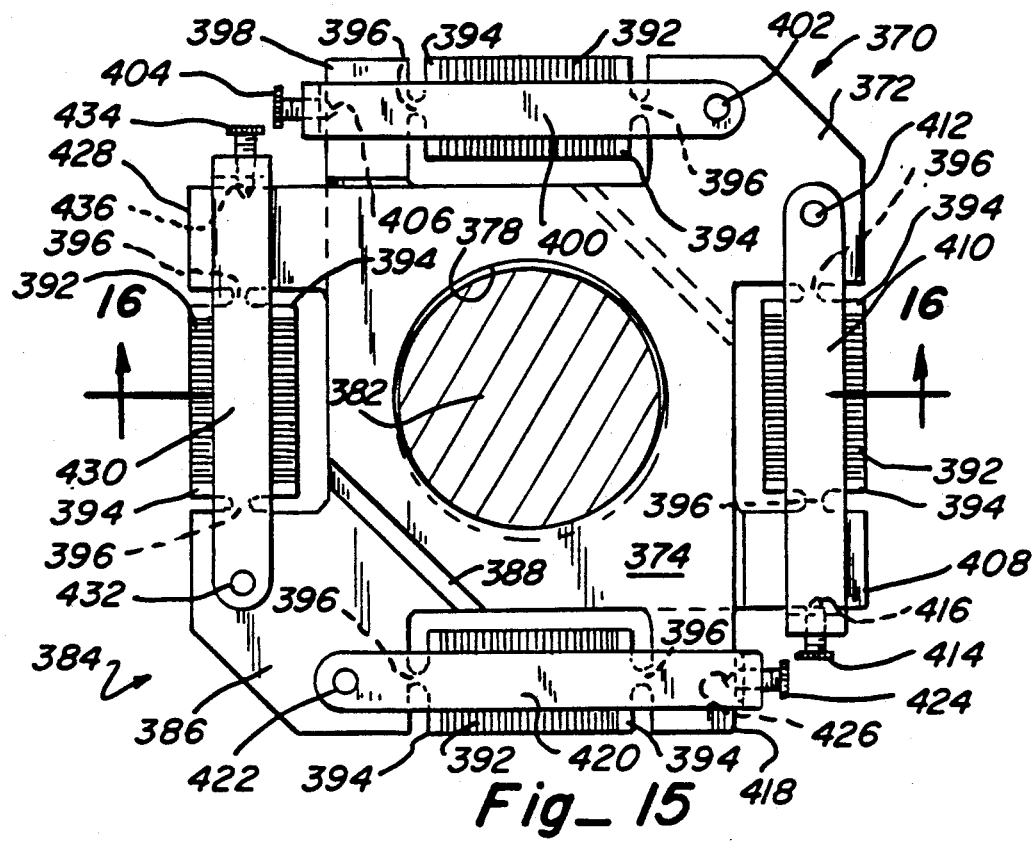
Fig_15
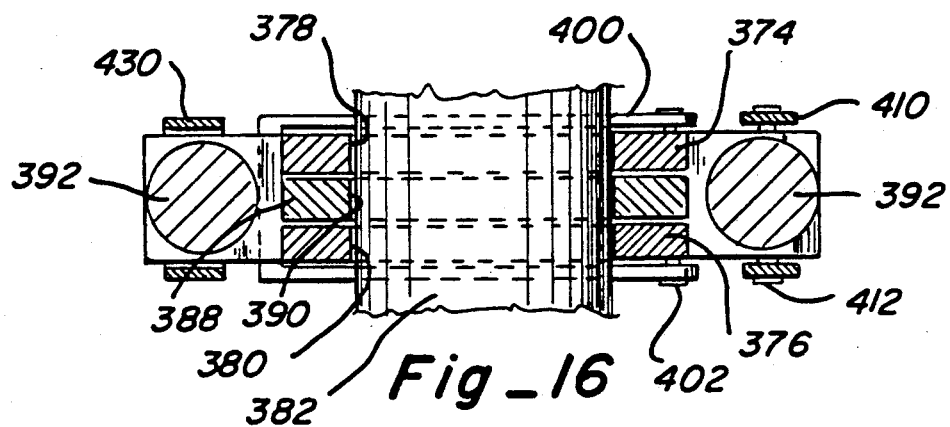
Fig_16
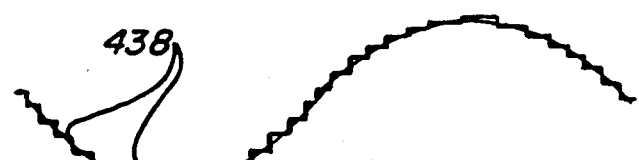
Fig_17

HIGH TORQUE HARMONIC TRACTION MOTOR

TECHNICAL FIELD

This invention relates to a motor which provides high torque and minimizes or eliminates slippage or backlash. More particularly, the invention is directed to a harmonic traction motor wherein at least two piezoelectric, electrostrictive or magnetostrictive elements, are energized sequentially to provide a hypocycloidic motion to rotate a driven shaft.

BACKGROUND ART

There has been a long felt need for a motor or actuator which has high torque, high stiffness, zero backlash, is compact and creates a reduced or minimal magnetic field. There also has been a need for such a motor which is capable of operating in a fine stepping mode. Such a device has particular application in mechanisms used in outer space as well as for robotics, precise control of telescopes or other precision instruments. Although many attempts have been made to utilize the unique capabilities of piezoelectric devices, none have been utilized to create an actuator or motor which incorporates all of the above-mentioned features.

Meissner U.S. Pat. No. 1,804,838 uses oscillations of a piezoelectric crystal to vibrate a disk into rotary motion. The torque output is quite small and the step size is nonrepeatable.

Duff et al. U.S. Pat. No. 3,315,103 uses an electrostrictive substance to produce angular deflections of the tip of a shaft. The actuator is subdivided in such a way as to allow digital control. This actuator does not produce rotary motion.

Vishnevsky et al. U.S. Pat. No. 4,019,073 describes a whole family of piezoelectric motor designs with vibrating rotors and/or stators. In all cases, however, the rotors and stators are held in contact by relatively light spring forces so that the torque output is quite low.

Toda et al. U.S. Pat. No. 4,339,682 and Osaka et al. U.S. Pat. No. 4,399,386 each uses a bimorph configuration of piezoactuator to generate a low force friction drive.

Tojo et al. U.S. Pat. No. 4,455,501 uses piezoactuators as both a locking or clamping device and a driving device. By properly timing the locking and unlocking with the extend-retract cycle of the drive actuators, the output shaft is made to rotate. This type of device should produce higher torques than the previously described devices, as well as repeatable step sizes. Mori U.S. Pat. No. 4,468,583 is a different configuration of the Tojo et al. patent.

Igashira et al. U.S. Pat. No. 4,471,256 discloses another piezoelectric actuator using a multitude of piezoelectric disks to produce a high-force device with a "large stroke", probably a few thousandths of an inch, with a "low" drive voltage. The voltage is probably 500 V or less, rather than the much higher voltage required for a solid stack of this length.

Sashida U.S. Pat. No. 4,562,374 includes a piezoelectric or electrostrictive driver which produces a standing or traveling surface wave in an elastic element. Since the wave crests tend to rotate in clockwise or counterclockwise ellipses, any movable surface held against the wave crests will be moved along in a rotary or linear mode depending on the configuration of the motor. The normal force is low and the output torque is in the inch-ounce range. This patent shows a version of a piezo motor using a hypocyloid or harmonic type of drive. The method of holding the driver or roller against each other is of the low force variety as it depends on a bending motion of the roller shaft.

Glett et al. U.S. Pat. No. 4,636,679 is directed to a clutch; however, it does show the use of piezoelectric stack to produce large forces.

Rodloff et al. U.S. Pat. No. 4,639,630 uses a piezoceramic in a stacked arrangement to adjust mirrors for a laser device.

A common difficulty with most prior art devices is that they must run at resonant frequencies, which are usually in the ultrasonic range, which is only practical for motors of small size and torque.

DISCLOSURE OF THE INVENTION

In accordance with the present invention, a harmonic traction motor is provided for converting linear motion to rotational motion. It includes a drive shaft mounted for rotation within a fixed support. In addition, a shaft driving member is provided which has an annulus surrounding the shaft and has a circumference just slightly larger than the circumference of the shaft. At least two actuating devices are connected between the support and the driving member at 90° with respect to each other. Means to sequentially energize and sinusoidally expand and contract each actuating device 90° out of phase is provided to force the annulus against the shaft in a hypocycloidic motion to turn the shaft. A reactive means can be connected between the fixed support and the driving member to respectively provide a return force of equal magnitude during the return of each of the actuator devices to its original size prior to the next energization. This prevents the actuators from ever going into tension which can damage them. The reactive means may be a spring means, another actuating device or the same actuating device responding to a decrease in voltage. Laminated or stacked piezoelectric and electrostrictive actuators have been found to be very suitable actuating devices. These actuators can produce strokes of several thousandths of an inch and can produce very high forces if restrained from fully expanding. Also, a magneto-strictor can be used as the actuating device.

From the foregoing, the advantages of this invention are readily apparent. A device has been provided to translate linear motion into rotational motion which has high torque, high stiffness, zero backlash and is space efficient. In addition, it creates smaller magnetic fields than other known devices thereby reducing electrical interference with other equipment.

Additional advantages of the invention will become apparent from the description which follows, taken in conjunction with the accompanying drawings.

BRIEF DESCRIPTION OF THE DRAWINGS

FIGS. 1A, 1B, 1C, and 1D show the sequential activation of electrostrictive devices to drive a shaft in accordance with this invention;

FIG. 2 is a voltage versus time graph showing the relative energization of the respective electrostrictive elements;

FIG. 3 is a top plan view of a harmonic traction motor constructed in accordance with this invention;

FIG. 4 is a perspective view of the motor of FIG. 3;

FIG. 5 is a horizontal section, taken along line 5—5 of FIG. 3 showing additional details of the invention;

FIG. 6 is a horizontal section, taken along line 6—6 of FIG. 3 showing still additional details of the invention;

FIG. 7 is a section taken along line 7—7 of FIG. 5, showing details of the electrostrictive device;

FIG. 8 is an exploded view of a portion of the motor of FIG. 3;

FIG. 9 is an electrical diagram showing how the power sources are connected to the actuating devices;

FIG. 10 is a top plan view of an alternative embodiment of the invention;

FIG. 11 is a horizontal section, taken along line 11—11 of FIG. 10 showing further details of this embodiment;

FIG. 12 is a horizontal section, taken along line 12—12 of FIG. 10, showing details of the mounting for the electrostrictive device;

FIG. 13 is a plan view of a further alternative embodiment of the present invention;

FIG. 14 is a horizontal section taken along line 14—14 of FIG. 13, showing the relationship of the apertures to the shaft;

FIG. 15 is a top plan view of a still further embodiment of the present invention;

FIG. 16 is a horizontal section, taken along line 16—16 of FIG. 15, showing further details of this embodiment; and FIG. 17 is a diagrammatic illustration of the discreet digital steps the shaft makes in response to the sinusoidal drive voltages show in in FIG. 2.

BEST MODE FOR CARRYING OUT THE INVENTION

Before considering specific embodiments of this invention, reference will be made to the diagrammatical illustration of FIGS. 1A, 1B, 1C and 1D along with the sine wave voltage graph of FIG. 2. As seen in FIG. 1A, a harmonic traction motor is shown wherein a driven shaft 10 is positioned within an annulus 12 of shaft driving member 14. The circumference of annulus 12 is just slightly greater than that of shaft 10. However, for clarity of illustration the difference in circumferences is greatly exaggerated. Shaft 10 is provided with a reference point 16 so that the rotation of the shaft can be followed. In FIG. 1A, an actuating device A has one end mounted to a fixed support 18 and the other end is connected to and bears against shaft driving member 14 which is movable with respect to fixed support 18. The actuating device can be any device which expands in a predetermined incremental manner upon the application of a voltage across it. Suitable devices are piezoelectric, electrostrictive or magnetostrictive elements. A maximum voltage has been applied to actuating device A, as illustrated in the graph of FIG. 2 causing it to expand thereby exerting a force to the left, as viewed in FIG. 1A, to cause annulus 12 to bear against shaft 10 at point 16. This actuating device can be a stack of piezoelectric discs or any other device that has similar properties, i.e., that expands upon the application of a voltage potential across it and contracts upon decrease of that voltage potential.

A second actuating device B is mounted 90° from actuating device A, as shown in FIG. 1A. At this point in the sine wave cycle a voltage has been applied to actuating device B as seen in FIG. 2 but it is not as great as that applied to actuating device A since it lags 90° behind the voltage applied to actuating device A.

However, proceeding to FIG. 1B, the voltage applied to actuating device B continues to increase to a maximum whereas the voltage being applied to actuating device A begins to decrease. Thus, actuating device A begins to contract and actuating device B expands to its maximum extent. This causes the line contact between shaft 10 and annulus 12 to progressively move in a clockwise direction to the point where the line contact between shaft 10 and annulus 12 is at the bottom of the shaft.

Proceeding from FIG. 1B to FIG. 1C, the voltage applied to actuating device B begins to decline and the voltage applied to actuating device A continues to decline to its minimum amount. A reactive means in the form of spring 20 exerts a force which holds annulus 12 against the left side of shaft 10.

Next, a voltage will again begin to be applied to electrostrictive device A while the voltage applied to electrostrictive device B continues to drop. Thus, at the position shown in FIG. 1D, a second reactive device, in form of spring 22, is exerting a force against shaft driving member 14 so that annulus 12 contacts shaft 10 at the top thereof.

Because of the difference in circumference of the annulus 12 and the shaft 10, the shaft will be rotated in a counter clockwise direction so that reference point 16 is moved through the arc shown between FIGS. 1A and FIG. 1D. Obviously, the sequential activation and deactivation of electrostrictive devices A and B by the selective application of voltages thereto, will cause the movement just described to continue so that shaft 10 is driven in the counter clockwise direction. It will be understood that because of the small ratio differential between the circumference of shaft 10 and annulus 12 that the shaft will move in very small incremental steps. A suitable lubricant can be provided between the surfaces to minimize wear. A particularly good lubricant for use in aerospace applications would be a layer of ion implanted gold.

A practical embodiment of applicant's invention is shown in FIGS. 3-8. Shaft 30 can be journaled in suitable bearings, such as bearings 32 and 34, shown in FIG. 5. Between the bearings is a sleeve 36, which is fixedly attached to shaft 30 or may be formed integrally with shaft 30, whose outer periphery forms a surface for the driving contact as described below. An upper driving plate 38 and a lower parallel driving plate 40 extend from one side of and are an integral part of mounting 42. Mounting 42 is attached to a fixed support 44, as by a pin 46, as shown in FIG. 3. The plates have central openings 48 and 50, respectively, through which shaft 30 and sleeve 36 extend, as best seen in FIG. 5. Openings 48 and 50 have circumferences which are just slightly larger than the circumference of sleeve 36. Conveniently, a third driving plate 52 has a central annulus 54 with a circumference slightly larger than that of sleeve 36 and approximately the same as the circumference of openings 48 and 50, which is innerlaid between plates 38 and 40. This plate is connected to a support 56 by a web 58 and to a second support 60 by a flexure membrane 62 which permits bending along a vertical axis but resists deflection in any other direction.

A first pair of electrostrictive devices 64 and 66 are mounted between mounting 42 and support 56 as best seen in FIG. 3. Electrostrictive device 64 is supported between a pair of pads 68 and 70 which are joined to mounting 42 and support 56 by flexure membranes 72 and 74, respectively. Similarly, electrostrictive device 66 is supported between mounting 42 and support 56 by pads 76 and 78 attached by a flexure membranes 80 and 82, respectively.

Support 56 is mounted for pivotal movement with respect to mounting 42 in response to expansion and contraction of the electrostrictive devices 64 and 66 by means of a pair of spaced U-shaped brackets 84 and 86. Bracket 84 has a pair of spaced upper and lower arms 88 each terminating in an enlarged end 90 through which the ends of a pivot pin 92 extend. This pin is secured in mounting 42. The arms 88 are interconnected by a base 94 having a threaded opening for receiving an adjustable set screw 95 whose inner end 96 bears against an indentation or recess 97, shown in FIG. 8, in the face of support 56 to allow pivotal movement therebetween. Brackets 84 and 86 are used to preload actuators 64 and 66 and to adjust the alignment of openings 48, 50 and 54, thereby providing a reactive means. Likewise, bracket 86 has upper and lower spaced arms 98 each terminating in an enlarged end 100 through which the ends of a pivot pin 102 extends. This pivot pin also is secured in mounting 42. The arms 98 are interconnected by a base 104 having a threaded opening for receiving an adjustable set screw 105 whose inner end 106 bears against indentation or recess 107 in the side edge of support 56 to allow pivotal movement therebetween.

The piezoelectric devices 64 and 66 are attached to a voltage source 180° out of phase such that as the voltage across 66 is increased it will expand while 64 contracts causing support 56 to pivot about mounting 42 in the direction of arrow 108. Upon the decrease in voltage across actuating device 66 and increase across 64, they will cause support 56 to tend to rotate about mounting 42 in the direction of arrow 110. Of course, it will be understood that these movements are very minute, but as a result of them, the annulus 54 of plate 52 will be brought into alternate contact on opposite sides with sleeve 36. This provides one component of the forces necessary to create the hypocycloidic rolling motion described with respect to FIGS. 1A-1D.

The other portion of this motion is created by alternate energization and deenergization of actuating devices 114 and 116 which are connected between mounting 42 and support 60. Actuating device 114 is supported at one end by pad 118 connected to mounting 42 by flexure member 120. The other end is supported by a pad 122 connected to support 60 through flexure member 124. Similarly, actuating device 116 is supported at one end by a pad 126 which is connected to mounting 42 by means of flexure member 128 and the other end of actuating device 116 is supported by a pad 130 connected to support 60 through flexure member 132.

Support 60 is pivotally attached to mounting 42 by means of a pair of U-shaped brackets 134 and 136. Bracket 134 has a pair of parallel spaced arms 138 which each have an enlarged end 140 having an opening through which the ends of a pivot pin 142 extend. Pivot pin 142 is secured in mounting 42. A base 144 joins the other end of the arms to each other and has a threaded opening through which a set screw 146 extends. The end 147 of set screw 146 serves as a pivot point bearing against the face of support 60. Similarly, bracket 136 has a pair of spaced arms 150 each of which has an enlarged end 152 through which the ends of pivot pin 154 extend. The arms are interconnected by a base 156 having a threaded opening through which a set screw 158 extends whose end 159 also serves as a pivot point against the side surface of support 60. Ends 147 and 159 may extend into indentations or recesses (not shown) in the face or surface of support 60. Brackets 134 and 136 are used for preloading and alignment, as were brackets 84 and 86 to provide a reactive means.

From the foregoing arrangement of parts, it can be understood that upon the application of a voltage to electrostrictive elements 114 and 116, which are connected 180° out of phase, they will expand/contract causing support 60 to rotate incrementally in a counter clockwise direction with respect to mounting 42 so as to move in the direction of arrow 160. Upon reversal of the voltage, the support 160 will move in a clockwise direction or in the direction of arrow 162. From the foregoing, it can be seen that if actuating elements 114, 66 and 116 are energized 90°, 180° and 270°, respectively, out of phase with electrostrictive element 64, the motion in FIGS. 1A-1D can be replicated causing shaft 30 to be rotated in a clockwise or counterclockwise direction as indicated by arrow 164. This will occur because the circumferences of annulus 54 and of openings 48 and 50 are slightly greater than the circumference of sleeve 36.

The electrical hook-up for the electrostrictive devices is diagrammatically shown in FIG. 9 wherein actuating devices 64 and 66 are connected with phase shifts of 0° and 180° from alternating current voltage source 166 and 168 and actuating devices 114 and 116 are connected with phase shifts of 90° and 270° from voltage sources 170 and 172. These voltage sources are activated through a timing circuit 174 which will cause the voltage sources to sequentially apply voltage to the actuating elements 64, 66, 114 and 116 out of phase with each other. Reversal of the motor can be accomplished simply by adding 180° to the phasing of actuating elements 114 and 116.

A still further embodiment of the invention is shown in FIGS. 10-12 wherein a driven shaft 220 is mounted for rotation within bearings 222 of upper and lower fixed plate 224. This device is similar in operation to the device of FIGS. 3-8 but more symmetric to minimize shaking forces transmitted to the supports. Conveniently, plates 224 each have a hub 225 for holding bearings 222. An actuating device is connected between the respective corners of the upper and lower plates. In this regard, one pair of corners of plates 224 have apertures for pivotally receiving pins 226 which extend from opposite sides of a disk 227 in the center of each actuating device 228. Pins 230 pivotally connect the other corner of plates 224 to disk 231 in the center of each actuator 232, as best seen in FIG. 10.

Between these two plates 224 are upper and lower motion transferring plates 234 which are identical in configuration and are superimposed, one above the other. A central drive plate 236, which has a configuration which is generally the reverse of plates 234, is positioned therebetween. As best seen in FIG. 11, shaft 220 is provided with a collar 238 which is illustrated as being integral with the shaft. The collar could be a separate element which is keyed or otherwise secured to shaft 220 so that both the shaft and collar rotate together. The outer periphery of collar 238 provides a driving surface for rotating shaft 220. Conveniently, each of plates 234 have an aperture or annulus 240, each of which is slightly greater in circumference than the periphery of collar 238. Similarly, central plate 236 has a central aperture or annulus 242 which is also slightly greater in circumference than the circumference of collar 238. Thus, upon sequential energization of the electrostrictive devices, the inner periphery of the apertures of the plates can be caused to move along the surface of collar 238 in a hypocycloidic motion causing shaft 220 to rotate in a stepping fashion.

One of actuators 228 is mounted between a pair of pads 246 and 248 which are connected by flexures 250 and 252, respectively, to attachment members 254 and 256, respectively. Attachment member 254 is connected to ear 258 of plate 236, as by welding, whereas attachment member 256 is connected between ears 262 of plates 234, also by welding. Similarly, another of actuators 232 is mounted between support pads 264 and 265 which are connected to attachment members 266 and 268 by flexures 270 and 272, respectively. Attachment member 266 is attached between ears 274 of plates 234. Connector member 268 is connected to ear 278 of plate 236.

The other actuator 232 is mounted between support pads 280 and 281 which are connected to attachment members 282 and 284 by means of flexures 286 and 288, respectively. Attachment member 282 is connected to ear 290 of plate 236. Attachment member 284 is connected between ears 294 of plates 234.

Finally, the other actuator 228 is mounted between support pads 298 and 300 which in turn are connected to attachment members 302 and 304, respectively, by means of flexures 306 and 308, respectively. Attachment member 302 is connected to ear 310 of plate 236. Attachment member 304 is connected between ears 314 of plates 234.

As best seen in FIG. 12, a center rod 316 extends through actuator 232 and the associated structure. The head 317 of this rod bears against attachment member 266 and a nut 318 is threadably received on the other end of rod 316 and bears against ear 278. Nut 318 can be tightened or loosened to adjust the preload tension on actuator 232. The tension must be sufficient to maintain actuator 232 under compression during all operating conditions of the device. The other actuator 232 and the actuators 228 are provided with similar tensioning means.

A still further, but simpler, embodiment is shown in FIGS. 13 and 14 which is useful for some purposes but has the drawback that the load path is through the bearings. This reduces the stiffness of the load path and therefore decreases the output torque. In this embodiment, a first member 320 and a second member 322 are interconnected by a pair of actuating devices 324 and 326 and by a rigid spacer 328. Actuating device 324 is mounted between a pair of pads 330 and 332, respectively. Conveniently, pad 330 is connected to one end of angular frame 334 of first member 320 by a flexure 336. Similarly, pad 332 is connected to one end of angular frame 338 of second member 332 by means of a flexure 339.

Actuating device 326 is supported between a pair of pads 340 and 342. Pad 340 is connected to angular frame 334 by flexure 344 and pad 342 is connected to angular frame 338 by flexure 346. First member 320 includes a driving plate 348 which is connected at one corner of angular frame 334, as shown. Plate 348 has an aperture or annulus 350 which is of slightly greater circumference than that of shaft 352 which extends therethrough. An arm 354 extends from plate 348 and is connected to rigid member 328 by means of flexure 356. The other end of member 328 is connected to frame 338 by means of flexure 358, as shown. The purpose of arm 354 is to allow x and y translation of annulus 350 but not rotation thereof. Member 322 has a pair of support arms 360 which extend upwardly from opposite sides of frame 338 and are held in place by bolts 362. The upper end of each support arm has a central bearing 363 in which shaft 352 is supported.

A U-shaped bracket 364 is attached to frame 338 by pivot pin 365 and applies tension to actuating device 324 by adjustment screw 366 at the opposite end. Similarly, U-shaped bracket 367 has one end attached to angular frame 334 by pivot pin 368 and applies tension to actuating device 326 by adjustment screw 369 at the other end.

From the discussion of the earlier embodiments, the operation of this embodiment should be readily apparent. The actuating devices 324 and 326 will be energized 90° out of phase so as to cause the surface of aperture 350 to engage shaft 352 in a hypocycloidic motion, thereby causing the shaft to rotate.

Another embodiment is shown in FIGS. 15 and 16 which utilizes four similar actuating devices. This apparatus includes a first member 370 having a corner support 372 from which upper and lower parallel plates 374 and 376 extend, respectively. These plates each have center openings 378 and 380, respectively, which are identical in diameter but slightly larger than the diameter of central shaft 382 extending therethrough. A second member 384 is provided which includes a corner support 386 opposite corner support 372 and has a central plate 388 extended therefrom which is parallel to and located between plates 374 and 376 and also has a central opening 390 through which shaft 382 extends. This central opening 390 is of the same diameter as that of openings 378 and 380.

The shaft is caused to rotate by the sequential actuation of four identical actuating devices 392. Each actuating device is supported by pads 394 at opposite ends thereof which are connected to flexures 396, as shown. As best be seen in FIG. 15, the actuator 392 shown at the upper portion of the apparatus extends between corner support 372 of first member 370 and an ear 398 which is attached to plate 388 of second member 384. Conveniently, a U-shaped bracket 400 is pivoted by means of pin 402 to corner support 372 and has a threadably adjustable set screw 404 extending through the opposite end of the bracket and received in a recess or dimple 406 in the side of ear 398, as shown. This permits appropriate pivotal movement between first member 372 and second member 384 in response to expansion and contraction of activating device 392. On the right side of the device shown in FIG. 15, the activating device is supported between corner support 372 and ear 408 which is also connected to plate 388, as shown. A U-shaped bracket 410 is provided which is pivoted at one end by pin 412 to corner support 372 and has a set screw 414 extended through the opposite end into a dimple 416 in ear 408.

Likewise, the activating device 392 shown at the bottom of FIG. 15 is supported between corner support 386 of second member 384 and ear 418 of upper plate 374 and a corresponding ear on lower plate 376. A U-shaped bracket 420 is pivoted to corner support 386 by pin 422 and has a set screw 424 at the opposite end which engages a dimple 426 in the side of ear 418. Similarly, the activating device 392 shown at the left-hand side of FIG. 14 is supported between corner support 386 and ear 428 of upper plate 374 and a corresponding ear of lower plate 376. A U-shaped bracket 430 is pivotally supported at one end by pin 432. A set screw 434 is provided at the opposite end of the bracket which engages a dimple 436 in the side of ear 428.

It can be seen that by sequentially activating the activating devices, in the manner shown in FIGS. 1A-ID, the periphery of openings 378, 380 and 390 will engage the shaft 382 in a hypocycloidic fashion to cause rotation of shaft 382. Now, if the sinusoidal drive voltages illustrated in FIG. 2 are in approximated discreet digital steps 438, as shown in FIG. 17, the shaft will rotate in a step mode with a very large number of steps per revolution of shaft 382.

Due to the high stiffness of the actuators, the motor shaft and surrounding structure, and the extremely small clearance between the shaft and the annulus or opening, the normal force between the shaft and the opening will be quite large even though the actuator stroke is quite small. Because of this, the motor will be free of backlash problems associated with typical motor and gear reducers because there are no gear teeth to cause backlash.

The motor is not back-drivable but will slip if an externally applied resistive torque exceeds the tractive torque produced by the normal force between the shaft and the annulus. This characteristic is advantageous as it can be considered as a built-in torque limiter or slip clutch.

When not configured to produce rotary motion, the actuators can be energized in such a way as to produce either a maximum breaking torque on the shaft by forcing the drive annulus or opening to its most misaligned positioned with respect to the shaft center line. For example, referring to FIG. 9, timer 174 can be programmed to simultaneously energize alternating current sources 166 and 170 which would expand electrostrictive element 64 and 114 simultaneously. Since these elements which are 90 degrees out of phase, will force the annulus 54 against the sleeve 36 of shaft 30 to act as a brake. A similar effect could be accomplished by simultaneously activating alternating current sources 168 and 172.

Alternatively, the device can be used as a clutch by centering the annulus with respect to the shaft. To create this effect, the circuitry of FIG. 9 can be designed so that timing circuit 174 activates each of alternating current voltage sources 166, 168, 170 and 172 simultaneously and to the same voltage so that electrostrictive element 64 and 66 exert equal but opposite forces and electrostrictive devices 114 and 116 also exert equal but opposite forces so as to center the annulus 54 about the sleeve 36 of shaft 30 so that sleeve 36 of shaft 30 can turn freely. Since the motor does not have the springingness of a magnetic coupling between the motor and stator, or the bending of gear teeth associated with gear reducers the device is very stiff and provides accurate incremental movements.

From the foregoing, it can be seen that by the use of flexures, as previously described, it is possible to minimize structural deflection and thus maximize the normal forces on the drive shaft.

A further advantage of this invention is that the device can be driven at very low frequencies, i.e., down near zero, and still produce torque. This low speed, high torque operation is not possible with known prior art devices which must be driven at their resonant frequency, usually in the ultrasonic range. This results in a motor which is of small size and has large output torque.

This invention has been described in detail with reference to particular embodiments thereof, but it will be understood that various other modifications can be effected within the spirit and scope of this invention.

I claim:

1. A harmonic traction motor for converting linear motion to stepped rotational motion, said motor comprising:
   a driven shaft, having a circumference, mounted for rotation;
   a fixed support;
   a shaft driving member having an annulus surrounding said shaft and having an inner circumference just slightly larger than said circumference of said shaft;
   at least two actuating devices connected between said fixed support and said driving member at 90° with respect to each other;
   means to sequentially energize each of said actuating devices 90° out of phase with each other to cause said actuating devices to sequentially expand and contract to force said annulus against said shaft in a hyocyloidic motion to turn said shaft in a stepping motion; and
   a timer circuit for activating said actuating devices simultaneously either with maximum voltage to push said annulus to its most misaligned position with respect to said shaft to produce maximum braking torque on said shaft or with just sufficient voltage to center said annulus with respect to said shaft to act as a clutch and permit free rotation of said shaft within said annulus.

2. A harmonic traction motor for converting linear motion to stepped rotational motion, said motor comprising:
   a driven shaft, having a circumference, mounted for rotation;
   a fixed support;
   a mounting pivotally attached to said fixed support and having a pair of outwardly extending parallel spaced plates, each plate having a central aperture of slightly greater circumference than said shaft circumference, said shaft being supported within said openings;
   an intermediate plate innerlaid between said first and second plates having an aperture with a circumference slightly greater than the circumference of the shaft with the shaft extending therethrough;
   a first support fixedly attached to said intermediate plate;
   a second support attached to said intermediate plate by a flexure member;
   at least one actuating device interconnected between said mounting and said first support by flexure members;
   a second actuating device interconnected between said mounting and said second support by flexure members;
   means pivotally connecting said first support member to said mounting;
   means pivotally connecting said second support to said mounting; and
   means to sequentially energize each of said actuating devices to expand and contract them 90° out of phase with each other to force the surface of said apertures of said pair of plates and intermediate plate against the shaft in a hypocycloidic motion to turn said shaft in a stepping motion.

3. Apparatus, as claimed in claim 2, wherein each of said pivot means includes means to preload said actuators which comprises:
- a U-shaped bracket having a pair of spaced parallel arms with distal ends;
- a pivot pin pivotally connecting said arms to said mounting;
- a base joining the proximate ends of the bracket having a threaded aperture therethrough; and
- a set screw in said threaded aperture for engaging said support to provide a pivot point thereon.

4. Apparatus, as claimed in claim 2, including:
first and second pairs of said actuating elements; and
first and second pair of said brackets interconnected between said mounting and said first and second supports, respectively.

5. A harmonic traction motor for converting linear motion to stepping rotational motion, said motor comprising:
- a driven shaft, having a circumference, mounted for rotation;
- a pair of spaced fixed support plates each having an opening with a bearing therein for supporting said driven shaft at spaced points, said plates being substantially square in configuration and having four corners;
- a first pair of actuating devices connected at their mid-points between first and second corners of said plates;
- a second pair of actuating devices having a length substantially equal to the length of said first pair of actuating devices connected at their mid-points between the third and fourth corners of said plates, said first pair of actuating devices being mounted at 90° with respect to each other and said second pair of actuating devices being mounted at 90° with respect to each other and opposite said first pair of actuating devices;
- attachment members connected to opposite ends of each of said actuating devices by flexure members;
- a first driving plate having a center aperture with a circumference slightly greater than said circumference of said driven shaft and including a first pair of ears pivotally connected to adjacent attachment members of said first pair of actuating devices and a second pair of ears pivotally connected to the most distal attachment members of said second pair of actuating devices;
- a second driving plate having a center aperture whose circumference is slightly greater than said circumference of said driven shaft and having a first pair of ears pivotally connected to the adjacent attachment members of said second pair of actuating devices and a second pair of ears attached to the most distal attachment members of said first pair of actuating devices; and
- means to sequentially energize and expand and contract each of said actuating devices 90° out of phase with each other to force said annulus against said shaft in a hypocycloidic motion to turn said annulus in a stepping motion.

6. Apparatus, as claimed in claim 5, where
the arrangement of said driving plates and actuating devices prevents load forces from being transmitted through said bearings.

* * * * *